Aug. 29, 1939.　　　　B. D. PICKERING　　　　2,171,481
SIGNAL DEVICE
Filed March 29, 1938

Inventor
B. D. Pickering.
By
Attorney

Patented Aug. 29, 1939

2,171,481

UNITED STATES PATENT OFFICE 2,171,481

SIGNAL DEVICE

Benjamin D. Pickering, Pomona, Calif.

Application March 29, 1938, Serial No. 198,778

2 Claims. (Cl. 88—80)

My invention is an improvement in signal devices of that special type which are carried on the wrist of drivers of automobiles and pedestrians to show a signal by reflected light.

In the operation of automobiles it is a common practice for the drivers to indicate their intentions in respect to the movement of the automobile by hand signaling, that is, by extending the left arm beyond the side of the automobile for this purpose, and in order that the signal may be visible while driving on a dark roadway at night it is desirable that a light be carried on the hand or arm used in signaling. In like manner, for the protection of a pedestrian crossing an unlighted highway, or walking thereon, his safety will be insured in great measure if he is also provided with a signal light on the hand or arm he uses in signaling his presence to the driver of an approaching automobile, and so that the signal may be seen by automobile drivers approaching in either one or both directions, the signal light should be carried on both sides of the hand or arm.

Signal lights of this character are usually provided by means of the common type of reflecting crystal used on different parts of a motor vehicle to reflect the headlights of an approaching vehicle, and these crystals are ordinarily held in place for hand signaling by means of wrist bands or straps.

Appreciating the utility of this method of night signaling the main object of my invention is to provide means for attaching the crystals to the wrist or arm that will be simple and economical in construction, easily and quickly applied to and removed from the wrist or arm, and so constructed that it will automatically adjust itself to wrists of different sizes or over the cuff of a coat sleeve as well as the gauntlet of a glove.

My invention therefore consists in the provision of a crystal holder comprising a U-shape frame of spring metal, to the outer ends of which the crystals are attached in a particular manner, whereby to facilitate the application of the signal device to the wrist or arm of the user, and its ready removal when not in use, as well as permit the device to be hung over the steering wheel of an automobile, or the belt of a pedestrian, and be otherwise convenient to carry.

In the drawing.

Like numerals of reference indicate like parts in the several views of the drawing.

The supporting frame for reflecting crystals used in hand signaling, in accordance with my invention, is preferably made of a strip of spring metal bent upon itself to provide a U-shape formation having a looped body portion 10 and parallel members 11, 11, to which latter the crystals 12, 12 are rigidly secured, whereby said supporting frame is adapted to be slipped over the wrist, gauntlet of a glove, or sleeve to locate the crystals at opposite sides thereof.

Figure 1:
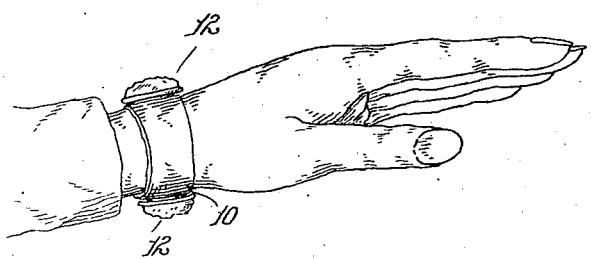
Figure 1 is a perspective view showing the application of my improved signal device to the wrist.
Figure 2:
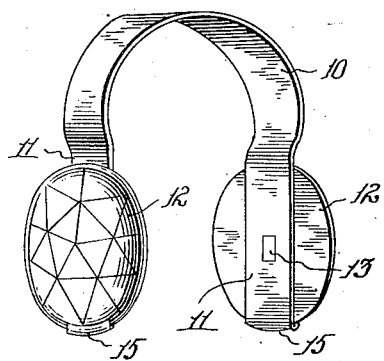
Fig. 2 is a detail perspective view of the device.
Figure 3:
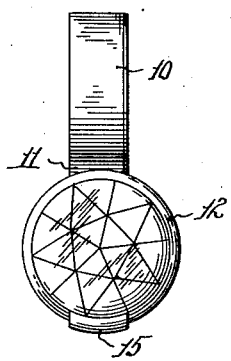
Fig. 3 is a side elevation.
Figure 4:
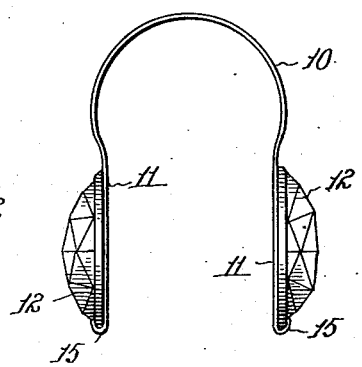
Fig. 4 is a front view.
Figure 5:
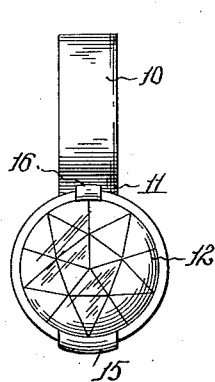
Fig. 5 is a side view illustrating a modification of my invention.
Figure 6:
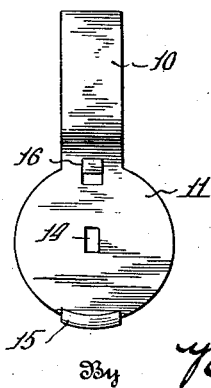
Fig. 6 is a detail view of the supporting frame employed in connection with the modified form.
Figure 7:
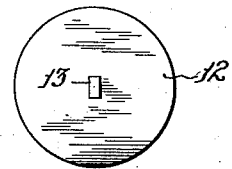
Fig. 7 is a rear view of the crystal.

For the purpose of attaching the reflecting crystals to the outer ends of the supporting frame the back of the frame in which the crystal is mounted is provided centrally with a projecting lug 13, preferably elongated, while the lower end of the member of the supporting frame to which the crystal is attached is provided with a corresponding hole 14 to receive the lug, and the lower end of said frame member turned up to form a retaining clip 15 in intimate engagement with the lower edge of the crystal or frame in which it is mounted. When a single clip is employed the lug projecting through the hole in the supporting frame is upset or riveted for rigidly securing the crystal in place on the outer side of the frame member, but when it is desired to have the reflecting crystals detachably connected to the supporting frame, for changing or replacing the same, the means of attachment shown in the modification Figs. 5 and 6, hereinafter described, is provided. Instead of riveting or heading the lug in the countersunk hole 14 it may be soldered, but in either instance it is desirable that the outer end of the lug or surface of the solder shall be flush with the inner side of the supporting frame member 11 for a smooth surface in contact with the wrist, and by turning the lower end of said frame member outward it will slide over the wrist in applying the signal device.

In the modification the crystal supporting member of the supporting frame is provided with an additional clip, 16, to engage the edge of the crystal opposite the clip 15, and the shape of the supporting frame member to which the crystal is attached is in the form of a disk to correspond with the shape of the back of the crystal so that the latter will have a greater bearing against the supporting frame. In this instance the clips 15 and 16 cooperate with the lug 13 and hole 14 in detachably connecting the crystal, for it will be obvious that in attaching the crystal the latter can be slipped sidewise into place as the lug will slide over the supporting frame member until it snaps into the opening, the resiliency of the supporting frame member permitting of this operation.

The supporting frame for the reflecting crystals may be made of any suitable metal having sufficient resiliency to permit of a slight spreading of the members to fit over the wrist or coat sleeve, and of course the connecting portion 10 being in the form of a loop will cause said members to grip the wrist or coat sleeve for holding the device thereon. Furthermore, the particular construction of the supporting frame allows for the frame members to be spaced to accommodate wrists of different sizes by exerting pressure to spread them apart or bring them nearer together for any approximate size of wrist or to pass over a coat sleeve or gauntlet of a glove, thereby providing a crystal supporting frame that is easily adjustable.

From the foregoing the application of my improved form of device for night signaling by the hand or arm of an automobile driver or pedestrian will be apparent, and it will be obvious that when not in use it can be hung on the steering wheel of a motor vehicle, on the belt of a pedestrian, or carried in the pocket of the user. The particular construction of the supporting frame also provides an arrangement that is more efficient than the ordinary strap or other support commonly used, for the reason that in the instant case provision is made for quick attachment and easy adjustment.

I claim:

1. A signal device to be carried on the wrist of the user, comprising a supporting frame of resilient material having a bowed connecting portion and spaced apart parallel terminal members formed integral therewith, whereby the parallel members will adjust themselves to the opposite sides of the wrist, each of said parallel members having a hole through the intermediate portion thereof and turned outwardly at its end to form a spring clip, and crystals attached to the parallel members of the supporting frame, each crystal having a lug engaging the hole with the outer end of the crystal in engagement with the spring clip.

2. A signal device to be carried on the wrist of the user, comprising a supporting frame of resilient material having a bowed connecting portion and spaced apart parallel terminal members formed integral therewith, whereby the parallel members will adjust themselves to the opposite sides of the wrist, each of said parallel members having an elongated hole through the intermediate portion thereof and out-turned clips spaced from the opposite ends of said elongated hole, and crystals attached to the parallel members of the supporting frame, each crystal having an elongated lug engaging the hole with the opposite ends of the crystal in engagement with the clips.

BENJAMIN D. PICKERING.